(12) United States Patent
Ohmi et al.

(10) Patent No.: US 8,130,340 B2
(45) Date of Patent: Mar. 6, 2012

(54) LIQUID CRYSTAL DISPLAY AND LIGHT GUIDE PLATE

(75) Inventors: Tadahiro Ohmi, Miyagi (JP); Yasuyuki Shirai, Miyagi (JP); Kiwamu Takehisa, Miyagi (JP); Mitsuo Matsumoto, Tokyo (JP); Tokuo Ikari, Tokyo (JP); Toshiaki Sato, Ibaraki (JP); Ikuo Onishi, Ibaraki (JP); Etsuo Nakazato, Ibaraki (JP); Yuichiro Yamada, Aichi (JP); Tokihiko Shinomiya, Nara (JP); Takashi Ishizumi, Nara (JP); Yuhsaku Ajichi, Kyoto (JP)

(73) Assignees: Tohoku University, Miyagi (JP); Kuraray Co., Ltd., Okayama (JP); Sharp Corporation, Osaka (JP)

( * ) Notice: Subject to any disclaimer, the term of this patent is extended or adjusted under 35 U.S.C. 154(b) by 0 days.

(21) Appl. No.: 11/990,751

(22) PCT Filed: Aug. 14, 2006

(86) PCT No.: PCT/JP2006/315998
§ 371 (c)(1),
(2), (4) Date: Feb. 21, 2008

(87) PCT Pub. No.: WO2007/023703
PCT Pub. Date: Mar. 1, 2007

(65) Prior Publication Data
US 2009/0103009 A1    Apr. 23, 2009

(30) Foreign Application Priority Data
Aug. 26, 2005 (JP) ................................. 2005-245809

(51) Int. Cl.
*G02F 1/13357* (2006.01)

(52) U.S. Cl. ........................................ 349/65
(58) Field of Classification Search .................... None
See application file for complete search history.

(56) References Cited

U.S. PATENT DOCUMENTS
5,808,708 A * 9/1998 Oyama et al. ................... 349/65
(Continued)

FOREIGN PATENT DOCUMENTS
CN    1144913    3/1997
(Continued)

OTHER PUBLICATIONS

Machine translation of detailed description, JP 5-15309 U (Feb. 1993).*
(Continued)

*Primary Examiner* — Mike Stahl
(74) *Attorney, Agent, or Firm* — Foley & Lardner LLP

(57) ABSTRACT

A large liquid crystal display (100) comprises a light guide plate (3) arranged on the back side of a liquid crystal panel (1). The front surface of the light guide plate (3) is flat, while the back surface thereof is concave. The upper and lower end faces of the light guide plate (3) respectively facing hot cathode fluorescent lamps (2a, 2b) have a convex shape projecting toward the respective lamps. White light from the fluorescent lamps is incident on the upper and lower end faces of the light guide plate directly or by being reflected by reflectors (4a, 4b), and propagates within the light guide plate while being reflected by the front and back surfaces of the light guide plate. At the front surface of the light guide plate, a part of the white light is directed toward the back side of the liquid crystal panel (1) by a light guide portion (5).

13 Claims, 10 Drawing Sheets

U.S. PATENT DOCUMENTS

| | | | |
|---|---|---|---|
| 5,816,677 A | 10/1998 | Kurematsu et al. | |
| 5,980,054 A * | 11/1999 | Fukui et al. | 362/625 |
| 5,995,690 A | 11/1999 | Kotz et al. | |
| 6,034,750 A | 3/2000 | Rai et al. | |
| 6,561,663 B2 | 5/2003 | Adachi et al. | |
| 7,556,391 B2 * | 7/2009 | Matsushita | 362/29 |
| 2001/0036068 A1 * | 11/2001 | Suzuki et al. | 362/31 |
| 2002/0172030 A1 * | 11/2002 | Matsumoto et al. | 362/31 |
| 2004/0042194 A1 * | 3/2004 | Hsieh | 362/31 |
| 2004/0114343 A1 * | 6/2004 | Ho | 362/31 |
| 2005/0243578 A1 | 11/2005 | Lee et al. | |

FOREIGN PATENT DOCUMENTS

| | | | |
|---|---|---|---|
| JP | U-158427/1987 | | 10/1987 |
| JP | U-53220/1992 | | 5/1992 |
| JP | 4-257824 | | 9/1992 |
| JP | U 15309-1993 | | 2/1993 |
| JP | 5-88166 A | * | 4/1993 |
| JP | 6-160638 | | 6/1994 |
| JP | 7-270618 A | * | 10/1995 |
| JP | 8-194222 A | * | 7/1996 |
| JP | 8-221013 A | | 8/1996 |
| JP | 8-293205 A | * | 11/1996 |
| JP | 9-82123 A | * | 3/1997 |
| JP | 11-306833 A | * | 11/1999 |
| JP | 2000-187211 A | | 7/2000 |
| JP | 2001-228477 A | | 8/2001 |
| JP | 2001-332115 A | | 11/2001 |
| JP | 2002-075036 A | | 3/2002 |
| KR | 1999-009044 | | 2/1999 |
| KR | 1999-0045985 | | 6/1999 |
| KR | 1999-0072571 | | 9/1999 |
| KR | 2004-0012393 | | 2/2004 |
| WO | WO 2006/028080 A1 | * | 3/2006 |

OTHER PUBLICATIONS

Vikuiti (TM) Rounded Brightness Enhancement Film (RBEF) brochure, dated Mar. 25, 2009. Retrieved through http://solutions.3m.com/wps/portal/3M/en_US/Vikuiti1/BrandProducts/main/productliterature/prismfilms/.*

* cited by examiner

LIQUID CRYSTAL DISPLAY AND LIGHT GUIDE PLATE

This application is the National Phase of PCT/JP2006/315998, filed Aug. 14, 2006, which claims priority to Japanese Application No. 2005-245809, filed Aug. 26, 2005, the disclosures of which are hereby incorporated by reference in their entirety.

TECHNICAL FIELD

This invention relates to a liquid crystal display and, in particular, relates to a structure of a large-sized liquid crystal display using a hot cathode fluorescent lamp as a backlight.

BACKGROUND ART

Generally, a liquid crystal display comprises a liquid crystal panel and a backlight unit for irradiating white light onto the back surface of the liquid crystal panel.

In a small or middle-sized (e.g. 20-inch or less) liquid crystal display for use in a personal computer or the like, use is made, as a structure of a backlight unit, of a structure in which a light guide plate is disposed on the back side of a liquid crystal panel and a fluorescent lamp as a light source is disposed on one side or each of both sides of the light guide plate. According to this structure, light from the fluorescent lamp enters the light guide plate from its end face and, while propagating in the light guide plate, part of the light is irradiated toward the back surface of the liquid crystal panel through the front surface of the light guide plate. In this manner, using the light guide plate, the light can be uniformly irradiated onto the back surface of the liquid crystal panel.

The fluorescent lamp used as the light source in the backlight unit of the liquid crystal display is a mercury lamp (a low-pressure mercury vapor discharge lamp, to be exact) with a phosphor coated on the inner surface of a tube thereof. In terms of light emission mechanisms, mercury lamps are classified into the hot cathode type that emits light by thermionic emission and the cold cathode type that emits light by secondary electron emission. The fluorescent lamp of the cold cathode type has a lifetime of as much as about 50,000 hours, which is as much as five times longer than that of the hot cathode type being about 10,000 hours. Accordingly, the fluorescent lamp of the cold cathode type is normally used as a light source for a liquid crystal display.

In the meantime, when a liquid crystal display increases in size, an increase in the quantity of light is also required to a backlight unit. This increase in the quantity of light can be dealt with by increasing the number of fluorescent lamps.

However, in the case of increasing the number of fluorescent lamps, it is necessary to also increase the thickness of a light guide plate (enlarge the incident plane of the light guide plate) according to the number of fluorescent lamps and thus there arises a problem of an increase in weight.

In view of this, in a conventional liquid crystal display, a light guide plate has a V-shaped groove structure on its back side so as to reduce the thickness thereof as approaching a center portion of a screen so that light is efficiently directed toward a liquid crystal panel, thereby achieving a reduction in weight (see, e.g. Patent Document 1).

Further, in the case of increasing the number of fluorescent lamps, there arise problems of an increase in power consumption, an increase in cost due to complication of a circuit structure (addition of an inverter for each fluorescent lamp), and so on. Further, in the case of the fluorescent lamp of the cold cathode type, even if the tube diameter is enlarged to increase the light emission amount per lamp, the light emission efficiency is lowered in inverse proportion to the tube diameter and thus there is also a problem of an increase in power consumption.

In view of this, in another conventional liquid crystal display, for the purpose of a reduction in power consumption and so on, the hot cathode type is used, instead of the cold cathode type, as a fluorescent lamp for use in a backlight unit (see, e.g. Patent Document 2).

The fluorescent lamp of the hot cathode type can achieve a light emission efficiency as high as twice or more that of the fluorescent lamp of the cold cathode type and, further, even if the quantity of light is increased by enlarging the tube diameter, the light emission efficiency is not lowered. Therefore, in illuminators and so on, use has already been made of fluorescent lamps of the hot cathode type with a diameter of about 30 mm that can achieve a light emission amount (total luminous flux) of as much as 2000 lumens or more per lamp (a quantity of light as much as about ten times that of a cold cathode tube with a diameter of 2 to 3 mm).

Patent Document 1: Japanese Unexamined Patent Application Publication (JP-A) No. 2001-228477 (particularly, Abstract and Paragraph 0005)

Patent Document 2: Japanese Unexamined Patent Application Publication (JP-A) No. 2000-187211 (particularly, Paragraph 0003)

DISCLOSURE OF THE INVENTION

Problem to be Solved by the Invention

While the diameter of a cold cathode fluorescent lamp used in a conventional liquid crystal display is 2 to 3 mm, the diameter of a hot cathode fluorescent lamp is 20 to 30 mm, i.e. very large. Further, it is necessary that the width of an end face of a light guide plate (the thickness of a light guide plate) be set greater than the diameter of a fluorescent lamp for efficient incidence of light from the fluorescent lamp. Therefore, in a backlight unit using a hot cathode fluorescent lamp as a light source, the width of an end face of a light guide plate becomes about 40 mm. Herein, considering a light guide plate for a 52-inch liquid crystal display, the area of its surface (main surface) is about 7500 cm$^2$ and, assuming that the thickness of the light guide plate is constant and the specific gravity of an optically transparent plastic forming the light guide plate is 1, its weight becomes as heavy as about 30 kg.

Herein, if an attempt is made to reduce the weight by taking the V-shaped groove structure on the back side of the light guide plate, the thickness of the thinnest portion should be set to 0 mm for reducing the weight to half as compared with the case where the thickness is constant. That is, with the V-shaped groove structure on the back side of the light guide plate, it is impossible to reduce the weight of the light guide plate to ½ or less as compared with the case where the thickness is constant.

It is an object of this invention to provide a light guide plate adaptable for a hot cathode fluorescent lamp and having a weight of ½ or less as compared with a constant-thickness (rectangular parallelepiped) light guide plate or a lightweight reflector in place of a light guide plate, thereby providing a large-sized liquid crystal display with a reduced weight.

Means for Solving the Problem

According to a first aspect of this invention, there is provided a liquid crystal display which has a plurality of linear or rod-like light sources disposed in substantially parallel to each other, a light guide plate disposed so that its longitudinal direction is substantially parallel to the light sources, reflecting means provided on a back surface of the light guide plate, a liquid crystal panel provided on a front surface side opposite to the back surface, and semi-transmissive reflecting means provided between the light guide plate and the liquid crystal panel. In the liquid crystal display, a thickness of the light guide plate decreases as going from its end faces, where light from the light sources is incident, to its inner portion and, further, the end faces each bulge in a convex lens shape.

Further, according to a second aspect of this invention, there is a liquid crystal display which has a plurality of linear or rod-like light sources disposed in substantially parallel to each other, a light guide plate having a plurality of grooves in which the light sources are placed, reflecting means provided on a back surface of the light guide plate, a liquid crystal panel provided on a front surface side opposite to the back surface, and semi-transmissive reflecting means provided between the light guide plate and the liquid crystal panel. In the liquid crystal display, a thickness of the light guide plate decreases as going away from its end faces where light from the light sources is incident and, further, the end faces each bulge in a convex lens shape.

Further, according to a third aspect of this invention, there is a liquid crystal display using, as a light source, a hot cathode fluorescent lamp having a pair of electrodes and a tube accommodating the pair of electrodes at its both end portions. The liquid crystal display uses, as the hot cathode fluorescent lamp, a hot cathode fluorescent lamp in which a diameter of an intermediate portion, connecting the both end portions, of the tube is smaller than that of each of the both end portions.

Further, according to a fourth aspect of this invention, there is a light guide plate having a front surface and a back surface facing each other and an end face connecting the front surface and the back surface, and serving to radiate light, incident on the end face from a light source, from the front surface. In the light guide plate, the front surface is flat, the back surface is concavely curved, and a thickness of the light guide plate decreases as a distance from the light source increases.

Furthermore, according to a fifth aspect of this invention, there is a liquid crystal display which has the light guide plate according to the fourth aspect and a liquid crystal panel disposed on the front surface side of the light guide plate.

In addition, according to a sixth aspect of this invention, there is a liquid crystal display which has a transparent flat plate, a reflector disposed so as to incorporate a light source and to cover a back surface of the flat plate to thereby cause light from the light source to be incident on the back surface of the flat plate, and a liquid crystal panel disposed on a front surface side of the flat plate.

EFFECT OF THE INVENTION

According to this invention, by reducing the thickness of a light guide plate as going from its end faces, where light of fluorescent lamps is incident, to its inner portion and bulging the end faces, where the light from the fluorescent lamps is incident, in a convex lens shape, the weight can be reduced to ½ or less as compared with a light guide plate having a uniform thickness, so that it is possible to reduce the weight of a liquid crystal display.

Further, using a hot cathode fluorescent lamp in which the diameter of a portion connecting both electrode portions is smaller than that of each electrode portion, the width of each end face of a light guide plate, i.e. the thickness of the light guide plate, can be further reduced and, therefore, the light guide plate and thus a liquid crystal display can be further reduced in weight.

Further, according to this invention, by forming the back surface of a light guide plate as a concavely curved surface, the weight can be further reduced as compared with a conventional V-shaped groove structure light guide plate, so that it is possible to achieve a reduction in weight of a liquid crystal display.

Furthermore, according to this invention, using a lightweight reflector in place of a light guide plate, it is possible to achieve a further reduction in weight of a liquid crystal display as compared with the case of using the light guide plate.

Figure 1:
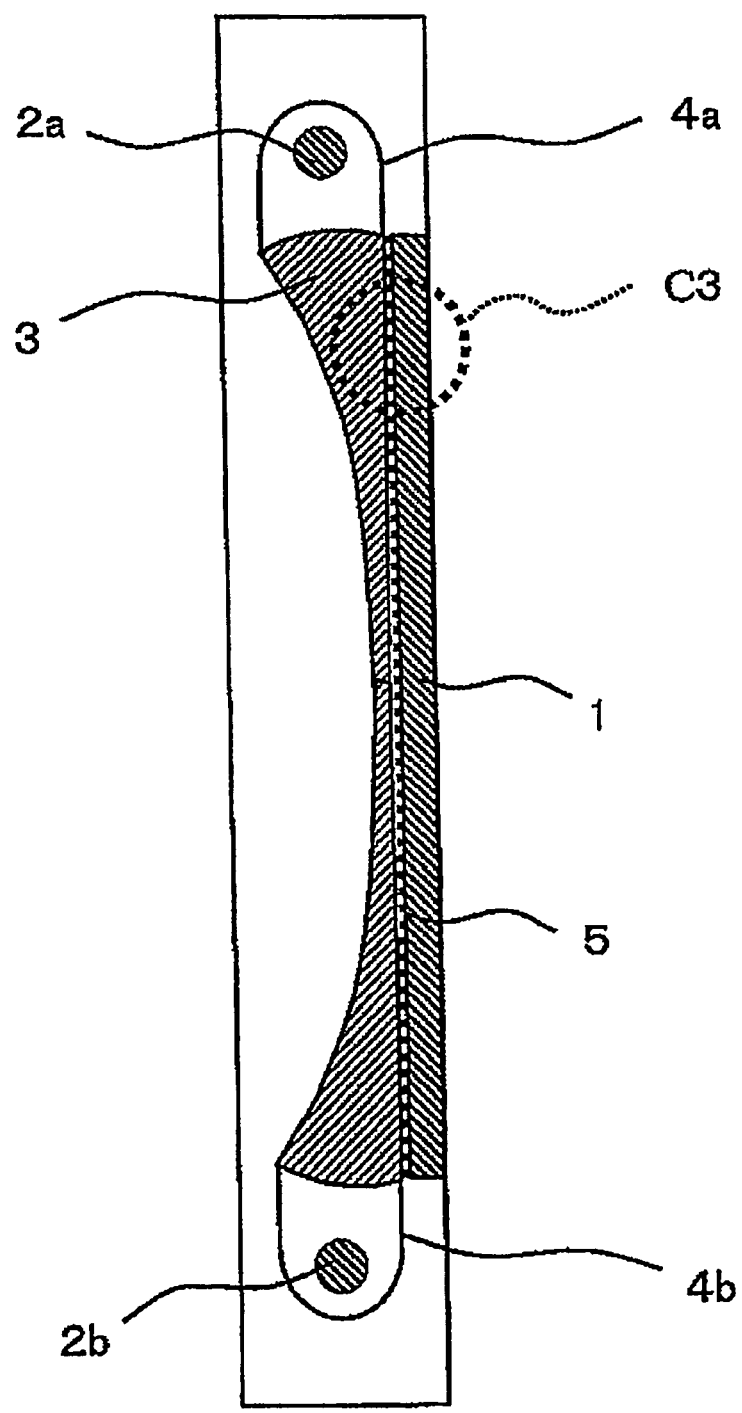
FIG. 1 is a longitudinal sectional view showing a schematic structure of a large-sized liquid crystal display according to a first embodiment of this invention.

DESCRIPTION OF SYMBOLS 1, 31, 41, 51, 61, 71, 1001 liquid crystal panel
2a, 2b, 32a, 32b, 42a, 42b, 52a, 52b, 62a, 62b, 72a, 72b, 1002a, 1002b fluorescent lamp
3, 43, 53, 63, 73a, 73b, 73c light guide plate
4a, 4b, 46a, 46b, 56a, 56b, 66a, 66b, 1004a, 1004b, 1004c reflector
5, 45, 55, 65, 75, 1005 light guide portion
100, 300, 400, 500, 600, 700, 1000 large-sized liquid crystal display
33a, 33b, 33c, 33d electrode
76a, 76b reflective plate
77a, 77b partially transmissive plate
800, 1006 silver plating

BEST MODE FOR CARRYING OUT THE INVENTION

Hereinbelow, embodiments of this invention will be described with reference to the drawings. A term "large-sized" herein represents a screen size of 20 inches or more, but not in the strict sense of the word, and this invention is also applicable to a liquid crystal display having a screen size of 20 inches or less.

FIG. 1 is a longitudinal sectional view, seen from the side, of a large-sized liquid crystal display 100 according to a first embodiment of this invention.

The large-sized liquid crystal display 100 comprises a liquid crystal panel 1, hot cathode fluorescent lamps 2a and 2b, a light guide plate 3, reflectors 4a and 4b, and a light guide portion (semi-transmissive reflecting means) 5.

Since the liquid crystal panel 1 is not directly related to this invention, a description thereof will be omitted.

The two hot cathode fluorescent lamps 2a and 2b are light sources of a backlight unit and are disposed along an upper end face and a lower end face, respectively, of the light guide plate (along the front-back direction of FIG. 1) so as to be substantially parallel (approximately parallel) to each other.

The light guide plate 3 is made of a transparent resin such as, for example, acrylic resin, methacrylic resin, or polycarbonate and has a front surface (right side in the figure) in the form of a flat (rectangular) surface and a back surface (left side in the figure) in the form of a concavely curved surface. Further, the upper end face and the lower end face facing the fluorescent lamps 2a and 2b bulge in a convex lens (semicylindrical) shape toward the fluorescent lamps 2a and 2b, respectively. Further, the back surface of the light guide plate 3 is coated with a reflective film for totally reflecting light, for example, a film mainly containing aluminum.

The reflectors 4a and 4b are formed of, for example, a resin and made lightweight and each have an inner surface coated with the same reflective film as the foregoing reflective film. These reflectors 4a and 4b reflect light emitted from the fluorescent lamps 2a and 2b so as to be incident on the upper and lower end faces of the light guide plate 3.

The light guide portion 5 causes part of the light entering the light guide plate 3 to proceed from its front surface to the liquid crystal panel.

Hereinbelow, the operation of this liquid crystal display will be described.

White light emitted from the fluorescent lamps 2a and 2b is directly incident on the upper end face and the lower end face, respectively, of the light guide plate 3 whose center portion is narrowed (thinned) or is incident on the upper end face and the lower end face, respectively, of the light guide plate 3 after being reflected by the reflective films of the reflectors 4a and 4b.

As described above, the upper and lower end faces of the light guide plate 3 each have the convex shape (three-dimensionally semicylindrical shape) projecting toward the fluorescent lamp 2a, 2b side. With this shape, the white light from the fluorescent lamps 2a and 2b is uniformly irradiated onto the back surface of the liquid crystal panel 1. This will be explained with reference to FIG. 2, (a) and (b).

Figure 2A:
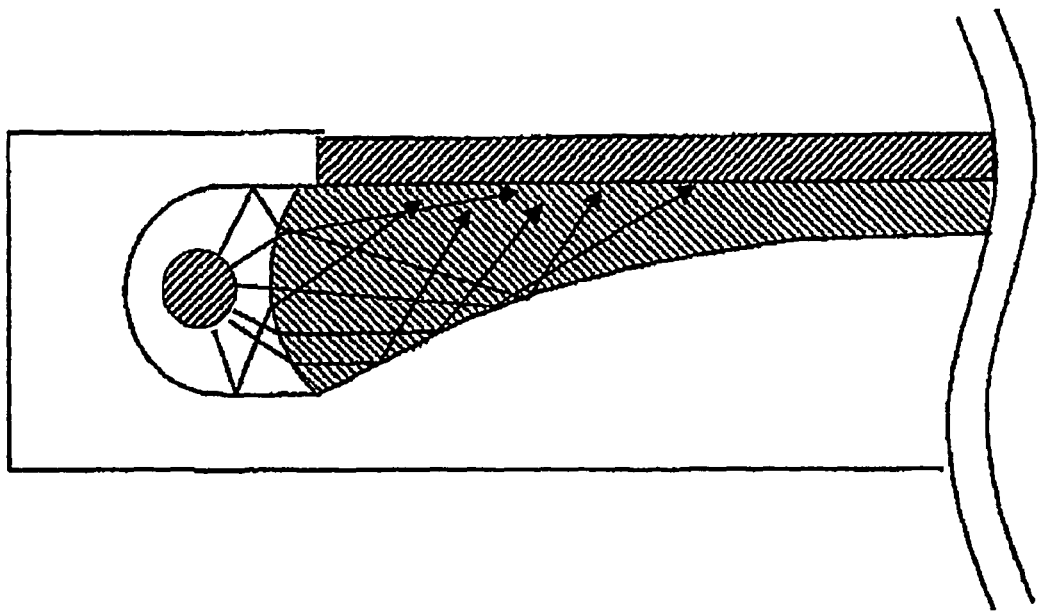
FIG. 2, (a) is a diagram showing an example of advancing paths of white light when end faces of a light guide plate are flat, while (b) is a diagram showing an example of advancing paths of white light when end faces of a light guide plate are convex.
Figure 2B:
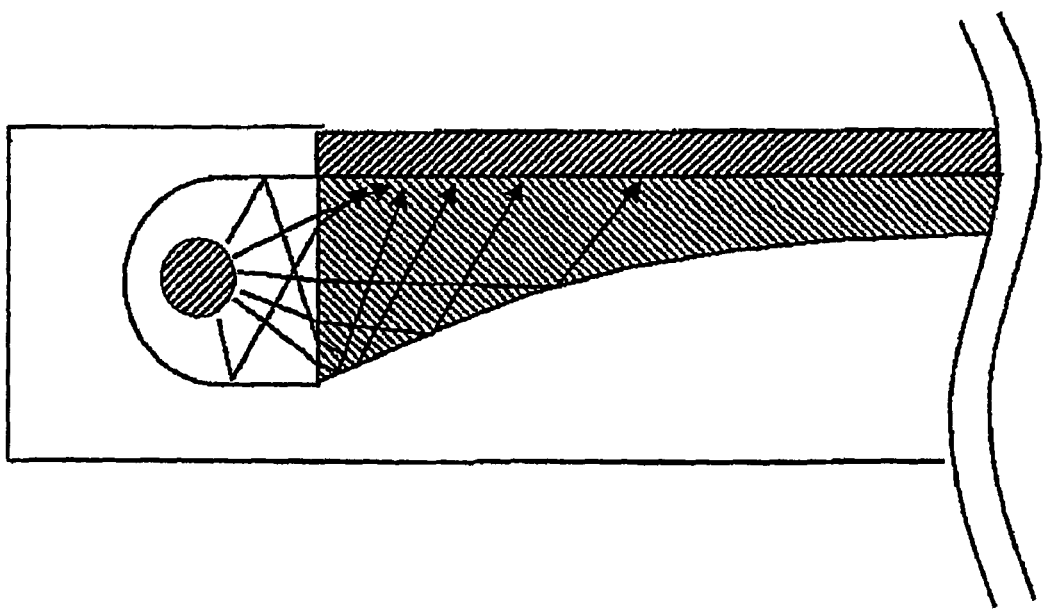

FIG. 2, (a) is an explanatory diagram showing an advancing manner of white light when the end faces of the light guide plate 3 in the large-sized liquid crystal display 100 are flat (not convex), while FIG. 2, (b) is an explanatory diagram showing an advancing manner of white light when the end faces of the light guide plate 3 are convex.

In the case of FIG. 2, (a), white light from the fluorescent lamps 2a and 2b is largely irradiated onto portions near the fluorescent lamps 2a and 2b, respectively. That is, the light intensity distribution in the liquid crystal panel 1 becomes high at its both end portions and low at its center portion with respect to the vertical direction.

On the other hand, in the case of FIG. 2, (b), light rays, in white light from the fluorescent lamps 2a and 2b, that can advance far (i.e. to the narrowed portion) within the light guide plate 3 increase, so that the incandescent light from the fluorescent lamps 2a and 2b is uniformly irradiated onto the liquid crystal panel 1.

As described above, by forming the end faces, where the incandescent light from the fluorescent lamps 2a and 2b is incident, into the convex shape, it is possible to increase the quantity of light that reaches the small-thickness portion in the case where the back surface of the light guide plate 3 is formed to be concavely curved, so that the entire surface of the liquid crystal panel can be uniformly illuminated. In other words, by forming the end faces, where the incandescent light is incident, into the convex shape, it is possible to reduce the thickness of the light guide plate 3 to its portions closer to the end portions and thus to achieve a further reduction in weight.

The white light entering the light guide plate 3 from its upper and lower end faces is, while proceeding in the light guide plate 3 by repeating total reflection at the front surface and the back surface of the light guide plate 3, partly led to the liquid crystal panel 1 by the light guide portion 5 disposed between the liquid crystal panel 1 and the light guide plate 3.

Figure 3:
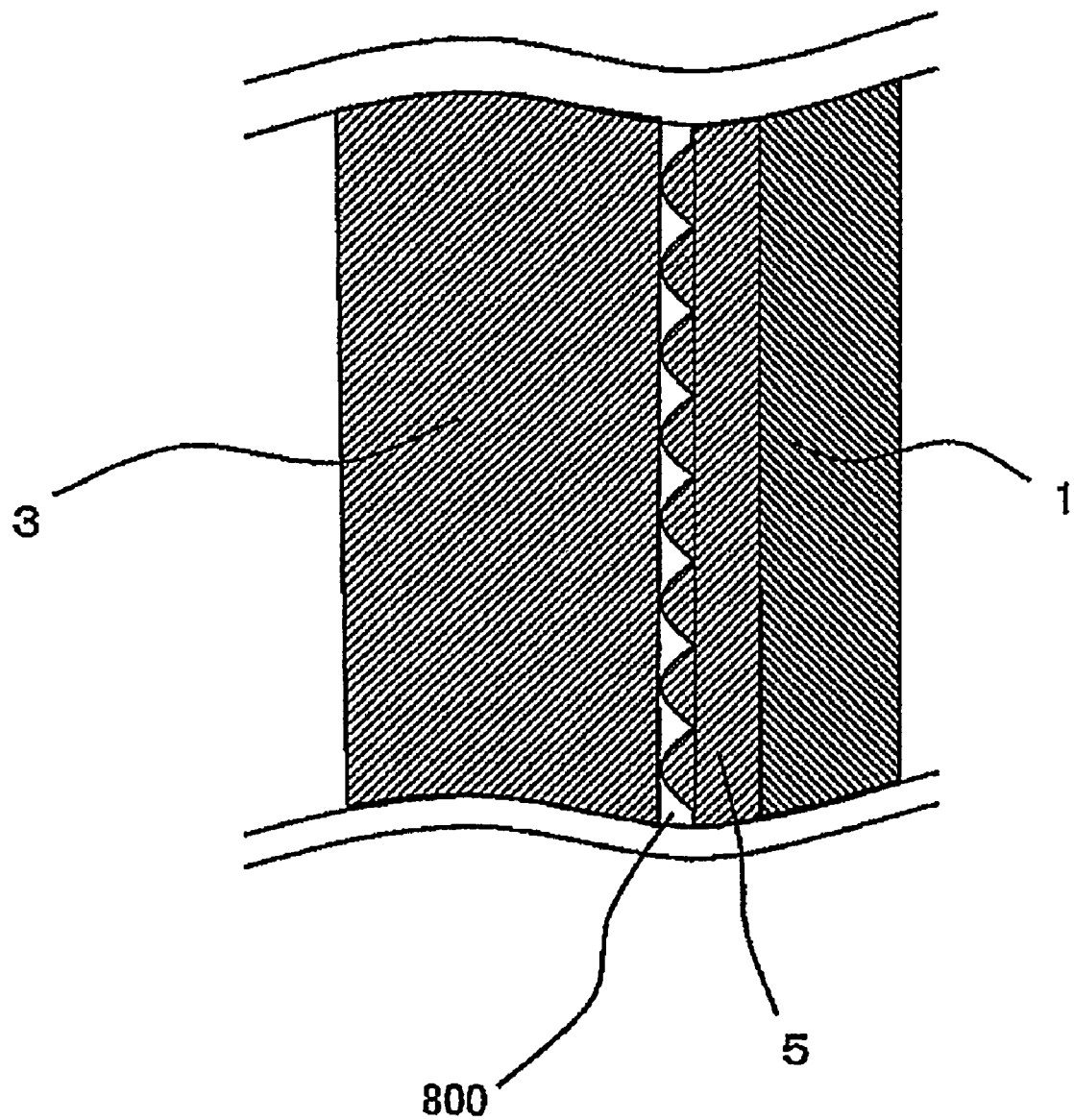
FIG. 3 is an enlarged view of the inside of a dotted circle in FIG. 1.

The function of the light guide portion 5 will be described with reference to FIG. 3 which is an enlarged view of the inside of a dotted circle C3 in FIG. 1. A surface, facing the light guide plate 3, of the light guide portion 5 is formed with a fine structure (microlens structure) as illustrated. The light guide portion 5 is made of the same material as that of the light guide plate 3 and, at portions where they are in contact with each other, the light proceeds without being reflected. As a result, part of the white light proceeding in the light guide plate 3 while repeating reflection advances into the light guide portion 5 through the contact points between the light guide plate 3 and the light guide portion 5. Further, by the function of the fine structure of the light guide portion 5, the light entering the light guide portion 5 is incident on the liquid crystal panel substantially perpendicularly thereto.

Silver plating 800, a metal film of aluminum or the like with a high reflectance, or a reflective material such as highly reflective polycarbonate may be provided between the light guide plate 3 and the light guide portion 5 (in gaps of the fine structure).

As a member usable for the light guide portion 5, there is, for example, trade name "MIRABRIGHT" (manufactured by KURARAY CO., LTD.) explained in Electronic Material, separate volume of the May 2000 issue, pp. 98-101.

As described above, according to this embodiment, by forming the back surface of the light guide plate 3 as the concavely curved surface, it is possible to achieve a reduction in weight of the light guide plate 3 as compared with a conventional V-shaped groove structure light guide plate having the same maximum thickness.

Next, a large-sized liquid crystal display according to a second embodiment of this invention will be described with reference to FIG. 4.

Figure 4:
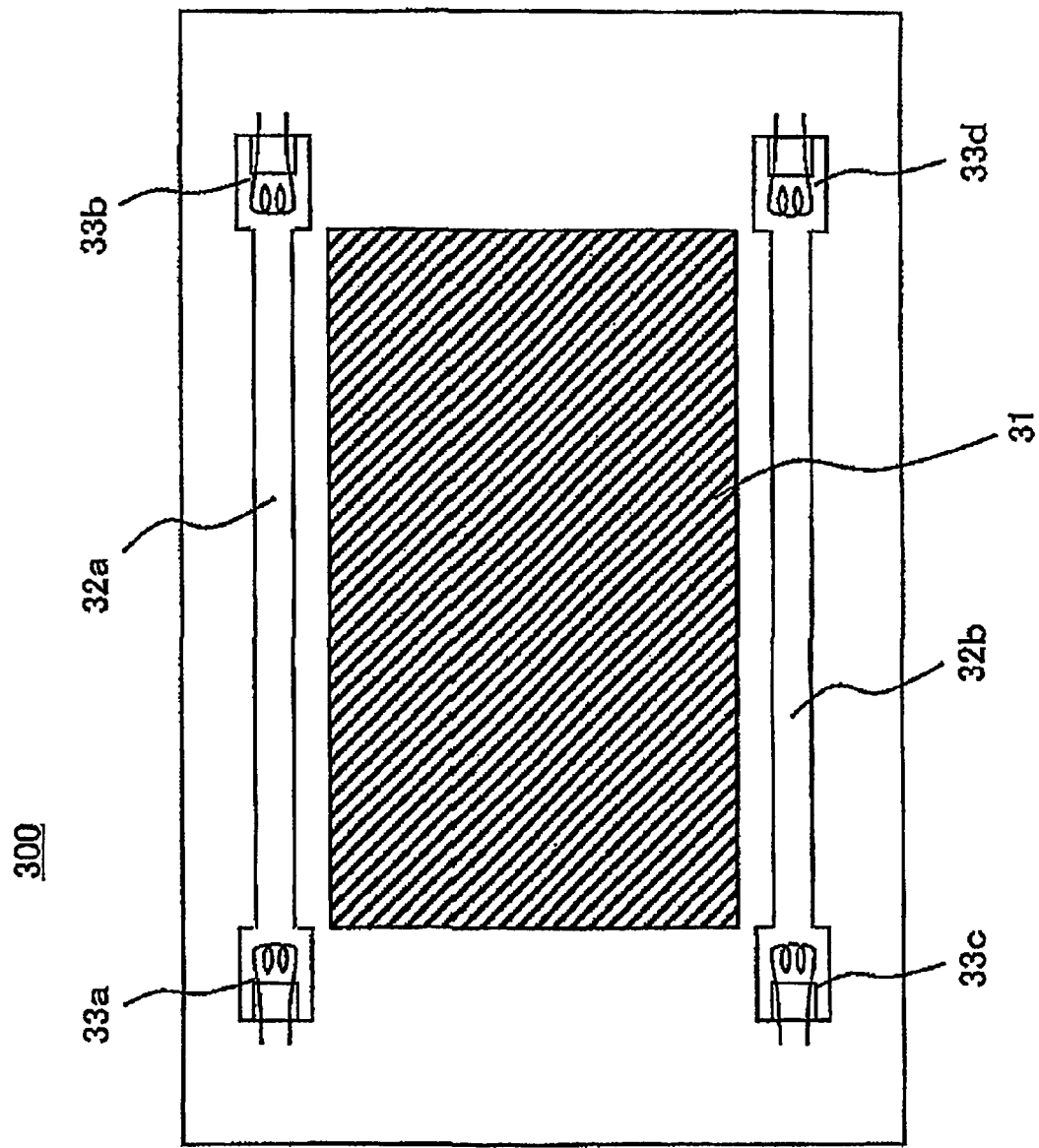
FIG. 4 is a front view showing a schematic structure of a large-sized liquid crystal display according to a second embodiment of this invention.

FIG. 4 is a structural diagram, seen from the front, of a large-sized liquid crystal display 300. In FIG. 4, although a liquid crystal panel 31 and fluorescent lamps 32a and 32b are illustrated, the basic structure of this large-sized liquid crystal display 300 is the same as that of the large-sized liquid crystal display 100 according to the first embodiment.

In the large-sized liquid crystal display 300, the two fluorescent lamps 32a and 32b are used for irradiating white light onto the back surface of the liquid crystal panel 31 using a non-illustrated light guide plate and so on. In each of these fluorescent lamps 32a and 32b, as compared with the diameter of each of both end portions where electrodes 33a and 33b or 33c and 33d are disposed, the diameter of an intermediate portion connecting these both end portions is set smaller. Since the light-emitting portions (intermediate portions) of the fluorescent lamps 32a and 32b are thin, it is possible to reduce the thickness of the light guide plate (not shown) used for leading white light emitted from the fluorescent lamps 32a and 32b to the back surface of the liquid crystal panel 31. Specifically, the outer diameter of the intermediate portion (the thin portion between the electrodes) of the fluorescent lamp 32a, 32b can be set to ½ (e.g. 15 mm) of each of both end portions. In other words, the diameter of the intermediate portion of the fluorescent lamp 32a, 32b can be set to about ½ of that of a conventional fluorescent lamp having equivalent performance (brightness, power consumption). As a result, the thickness (the width of each end face serving as an incident plane) of the light guide plate can also be set to ½ as compared with the case of using the conventional fluorescent lamp and thus the weight can also be reduced to ½ (when the thickness is constant).

Next, a large-sized liquid crystal display according to a third embodiment of this invention will be described with reference to FIG. 5.

Figure 5:
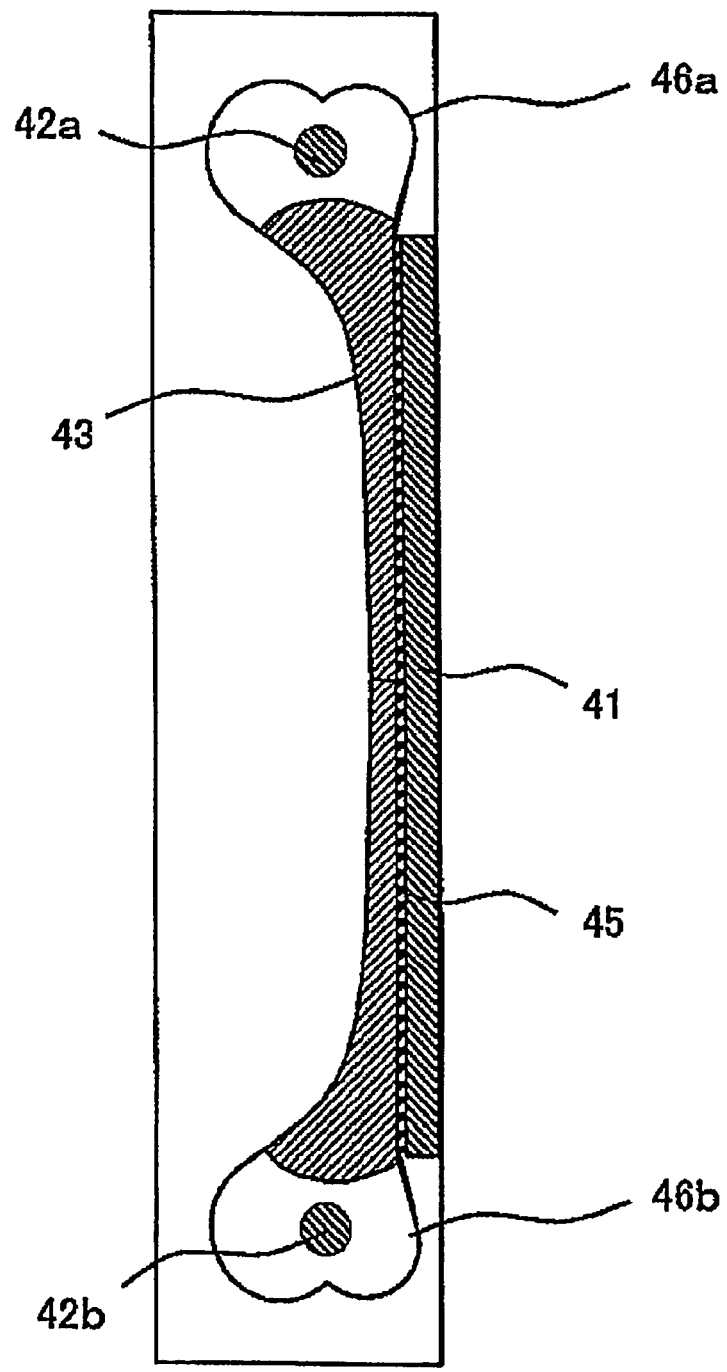
FIG. 5 is a longitudinal sectional view showing a schematic structure of a large-sized liquid crystal display according to a third embodiment of this invention.

FIG. 5 is a longitudinal sectional view, seen from the side, of a large-sized liquid crystal display 400. This large-sized liquid crystal display 400 comprises a liquid crystal panel 41, fluorescent lamps 42a and 42b, a light guide plate 43, a light guide portion 45, and reflectors 46a and 46b and the basic structure thereof is the same as that of the large-sized liquid crystal display according to the first embodiment. However, the shape of the reflectors 46a and 46b differs from that of the reflectors 4a and 4b of the large-sized liquid crystal display according to the first embodiment and the shape of the back surface of the light guide plate 43 also differs from that of the light guide plate 3.

Also in this large-sized liquid crystal display 400, the two fluorescent lamps 42a and 42b are used for irradiating white light onto the back surface of the liquid crystal panel 41 using the light guide plate 43. White light emitted from the respective fluorescent lamps 42a and 42b partly enters the light guide plate 43 directly and partly enters the light guide plate 43 after being reflected by the reflectors 46a and 46b.

The sectional shape of each reflector 46a, 46b is formed as double circles, i.e. the shape formed by two circles connected together. A connection point between the two circles is located on the side opposite to the light guide plate 43 with respect to the fluorescent lamp 42a, 42b. According to this structure, in the white light emitted from the fluorescent lamp 42a, 42b, the ratio of the component, that is initially headed in a direction exactly opposite to the light guide plate 43 and then proceeds into the light guide plate 43, is improved. That is, in the case of using the simple circular reflectors 4a, 4b as shown in FIG. 1, if the light proceeding in the direction opposite to the light guide plate is reflected by the reflector, the ratio of the light directed again toward the lamp is high and, as a result, the light is absorbed in the lamp so as to be lost. In contrast, by taking the double circles as in this embodiment, the loss due to this reentry into the lamp can be reduced and, as a result, the utilization efficiency of the white light from the lamp can be improved by as much as about 10%. Although the double circles are used in the above description, use may be made of an ellipse as one of them or double ellipses.

Further, in this embodiment, the shape of an ellipse with an eccentricity of about 0.95 is used as a shape of the back surface, i.e. a reflective surface on the left side in the figure, of the light guide plate 43. The reason for adopting the elliptical shape with such a high compression ratio is that the ratio in which the thickness of the light guide plate 43 decreases as going from its end portion toward its center portion is high and, as a result, the weight of the light guide plate 43 can be further lightened. Instead of the elliptical shape, use may be made of another shape such as, for example, a cubic curve or a quartic curve.

Next, a large-sized liquid crystal display according to a fourth embodiment of this invention will be described with reference to FIG. 6.

Figure 6:
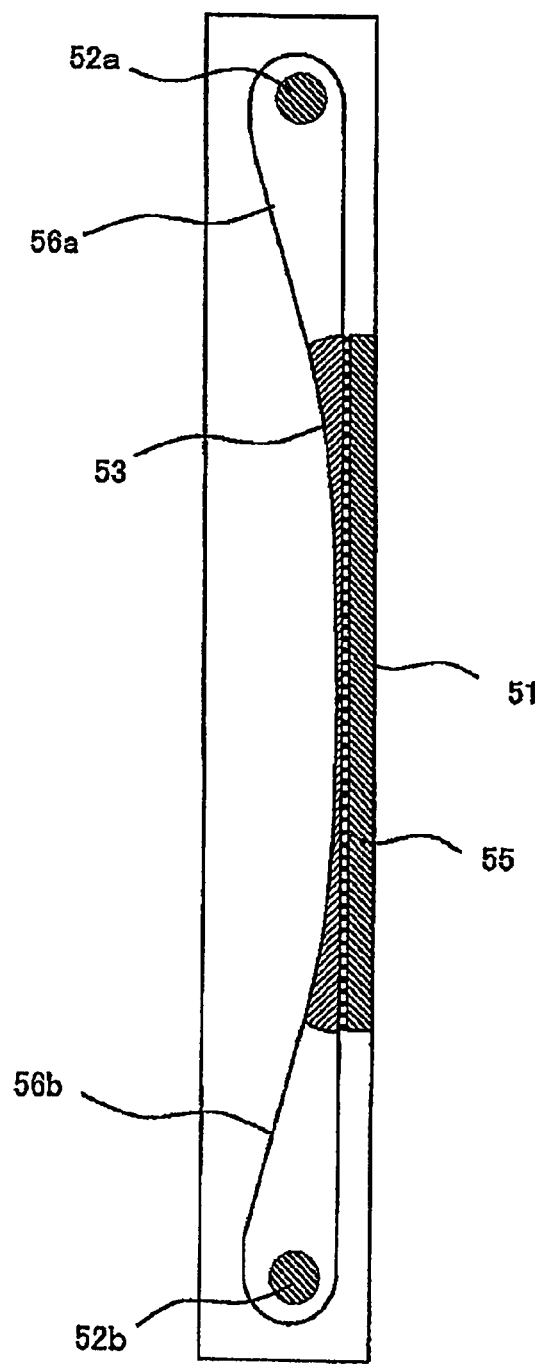
FIG. 6 is a longitudinal sectional view showing a schematic structure of a large-sized liquid crystal display according to a fourth embodiment of this invention.

FIG. 6 is a longitudinal sectional view, seen from the side, of a large-sized liquid crystal display 500. This large-sized liquid crystal display 500 comprises a liquid crystal panel 51, fluorescent lamps 52a and 52b, a light guide plate 53, a light guide portion 55, and reflectors 56a and 56b and the basic structure thereof is the same as that of the large-sized liquid crystal display according to the first embodiment.

The large-sized liquid crystal display 500 is intended for a large reduction in weight of the light guide plate 53, wherein the distance between each fluorescent lamp and the light guide plate is prolonged as compared with the large-sized liquid crystal display 100 shown in FIG. 1. In order to lead white light emitted from the fluorescent lamps 52a and 52b into the light guide plate 53, use is made of the reflectors 56a and 56b that are longer vertically in the figure than the reflectors 4a and 4b. The width of an opening (a connection portion with an end face of the light guide plate 53) of the reflector 56a, 56b is smaller than the diameter of the fluorescent lamp 52a, 52b. Using these long reflectors 56a and 56b, the spreading width of the white light is narrowed as advancing toward the light guide plate 53 and, as a result, it is possible to reduce the width of each end portion of the light guide plate 53. Consequently, since the light guide plate 53 can be thinned, its weight can be lightened. According to this embodiment, not only the large-sized liquid crystal display itself can be lightened, but also the amount of use of expensive polycarbonate generally used for light guide plates can be reduced and thus a reduction in cost can be achieved.

Next, a large-sized liquid crystal display according to a fifth embodiment of this invention will be described with reference to FIG. 7.

Figure 7:
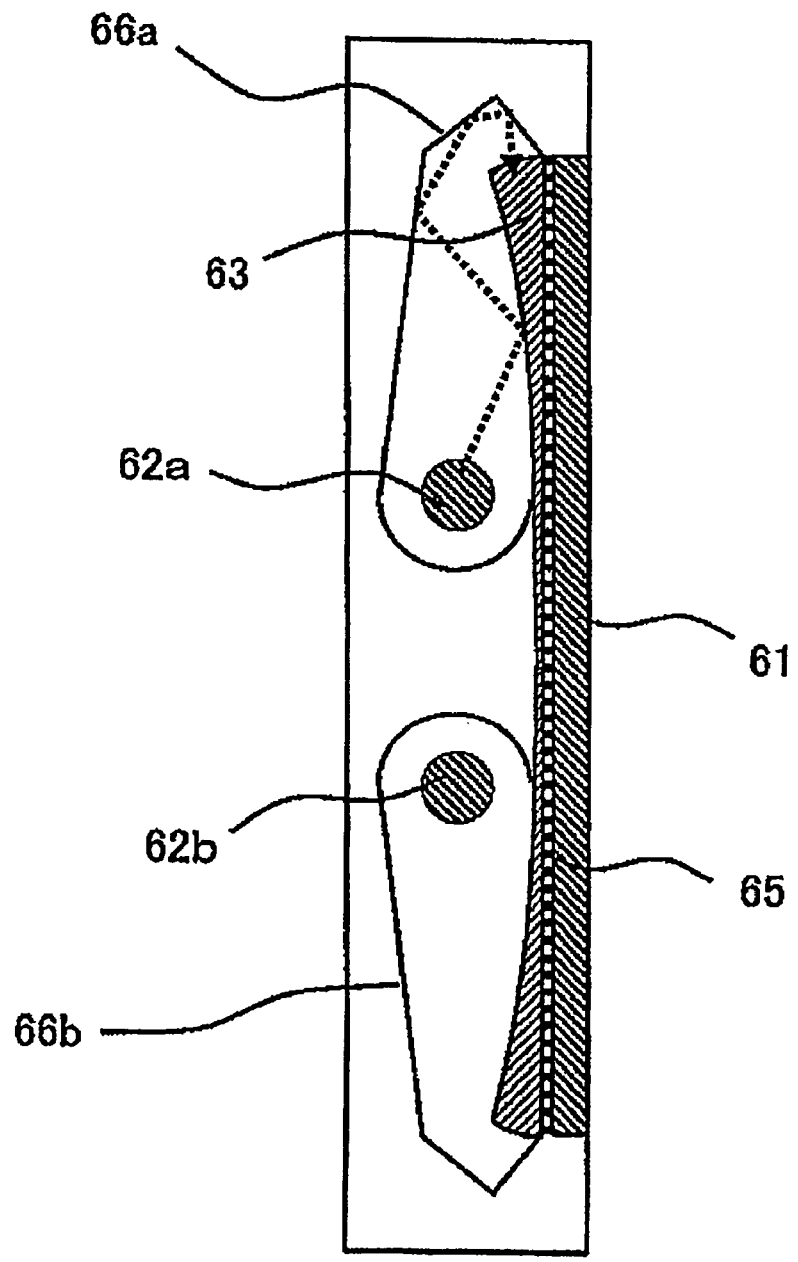
FIG. 7 is a longitudinal sectional view showing a schematic structure of a large-sized liquid crystal display according to a fifth embodiment of this invention.

FIG. 7 is a longitudinal sectional view, seen from the side, of a large-sized liquid crystal display 600. This large-sized liquid crystal display 600 comprises a liquid crystal panel 61, fluorescent lamps 62a and 62b, a light guide plate 63, a light guide portion 65, and reflectors 66a and 66b and the basic structure thereof is the same as that of the large-sized liquid crystal display according to the fourth embodiment.

In the case of the large-sized liquid crystal display 500 shown in FIG. 6, the reflectors 56a and 56b are long in the vertical direction in the figure and thus the height of the entire display increases. In view of this, in the large-sized liquid crystal display 600 according to this embodiment, for the purpose of avoiding it, the fluorescent lamps 62a and 62b are disposed on the back side of the light guide plate 63 and white light from the fluorescent lamps 62a and 62b is led to upper and lower end faces of the light guide plate using the reflectors 66a and 66b. For example, a light ray from the fluorescent lamp 62a, indicated by a dotted line in the figure, is reflected by the back surface of the light guide plate 63 and the side surface of the reflector 66a so as to proceed to the tip end of the reflector 66a and is further reflected twice there by two flat surfaces arranged perpendicular to each other so as to advance into the light guide plate 63. In this manner, in this embodiment, the length (actually the height) of the entire display in the vertical direction in the figure can be reduced even as compared with the first embodiment and, further, it is possible to achieve a reduction in weight equivalent to the fourth embodiment.

Next, a large-sized liquid crystal display according to a sixth embodiment of this invention will be described with reference to FIG. 8.

Figure 8:
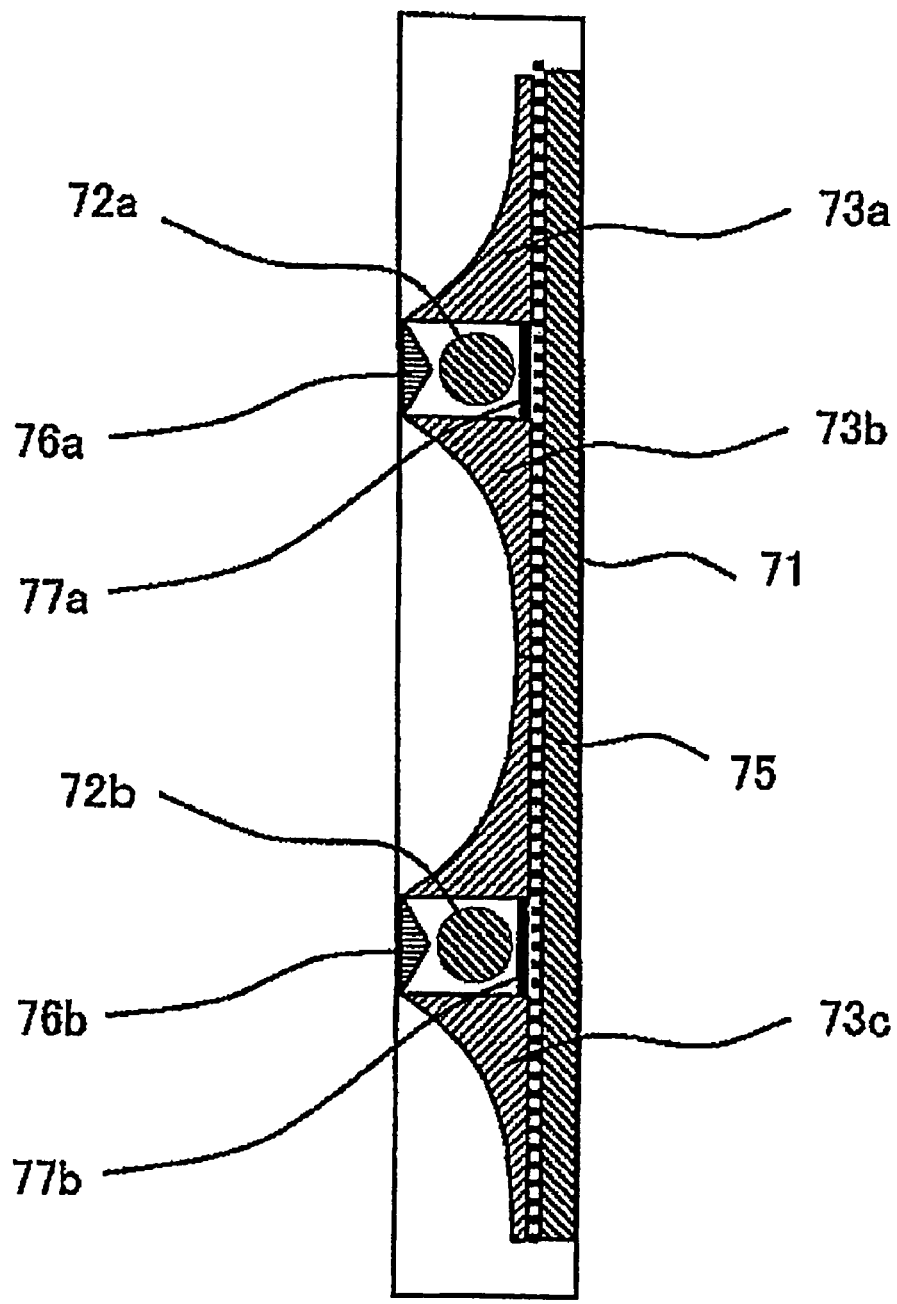
FIG. 8 is a longitudinal sectional view showing a schematic structure of a large-sized liquid crystal display according to a sixth embodiment of this invention.

FIG. 8 is a longitudinal sectional view, seen from the side, of a large-sized liquid crystal display 700. This large-sized liquid crystal display 700 comprises a liquid crystal panel 71, fluorescent lamps 72a and 72b, light guide plates 73a, 73b, and 73c, a light guide portion 75, reflective plates (reflectors) 76a and 76b, and partially transmissive plates 77a and 77b.

In the large-sized liquid crystal display 700, the two fluorescent lamps 72a and 72b are disposed on the back side of the liquid crystal panel 71. That is, the fluorescent lamps 72a and 72b are received in grooves formed by the three-divided light guide plates 73a, 73b, and 73c. White light from the fluorescent lamps 72a and 72b is irradiated onto the entire back surface of the liquid crystal panel 71 through the light guide plates 73a, 73b, and 73c. End faces, facing the fluorescent lamps 72a and 72b, of the light guide plates 73a, 73b, and 73c are flat in FIG. 8, but may be convex like in the first embodiment and so on.

The triangular reflective plates 76a and 76b disposed on the side opposite to the liquid crystal panel 71 with respect to the fluorescent lamps 72a and 72b reflect, upward and downward, white light that is emitted from the fluorescent lamps 72a and 72b and advances in a direction opposite to the liquid crystal panel. As a result, the reflected white light tends to enter the light guide plates 73a, 73b, and 73c.

On the other hand, the partially transmissive plates 77a and 77b are disposed between the fluorescent lamps 72a and 72b and the liquid crystal panel 71. The partially transmissive plates 77a and 77b cause part of white light proceeding toward the liquid crystal panel 71 from the fluorescent lamps 72a and 72b to be directly incident on the liquid crystal panel 71. As the partially transmissive plates 77a and 77b, use can be made, for example, of polycarbonate mixed with titanium oxide. It is known that if titanium oxide is mixed into polycarbonate, the titanium oxide-mixed polycarbonate reflects white light at a high reflectance (diffuse reflection), but, if the thickness thereof is reduced to, for example, about 0.1 mm, it is possible to partially transmit the white light. As the titanium oxide-mixed polycarbonate, for example, highly reflective polycarbonate (trade name: lupilon) manufactured by Mitsubishi Engineering-Plastics Corporation is put on the market.

In this embodiment, the light guide plate is divided into three. However, grooves for receiving the fluorescent lamps may be formed without dividing the light guide plate. In this case, the partially transmissive plate is provided on the bottom surface of each groove.

Next, a large-sized liquid crystal display according to a seventh embodiment of this invention will be described with reference to FIGS. 9 and 10.

Figure 9:
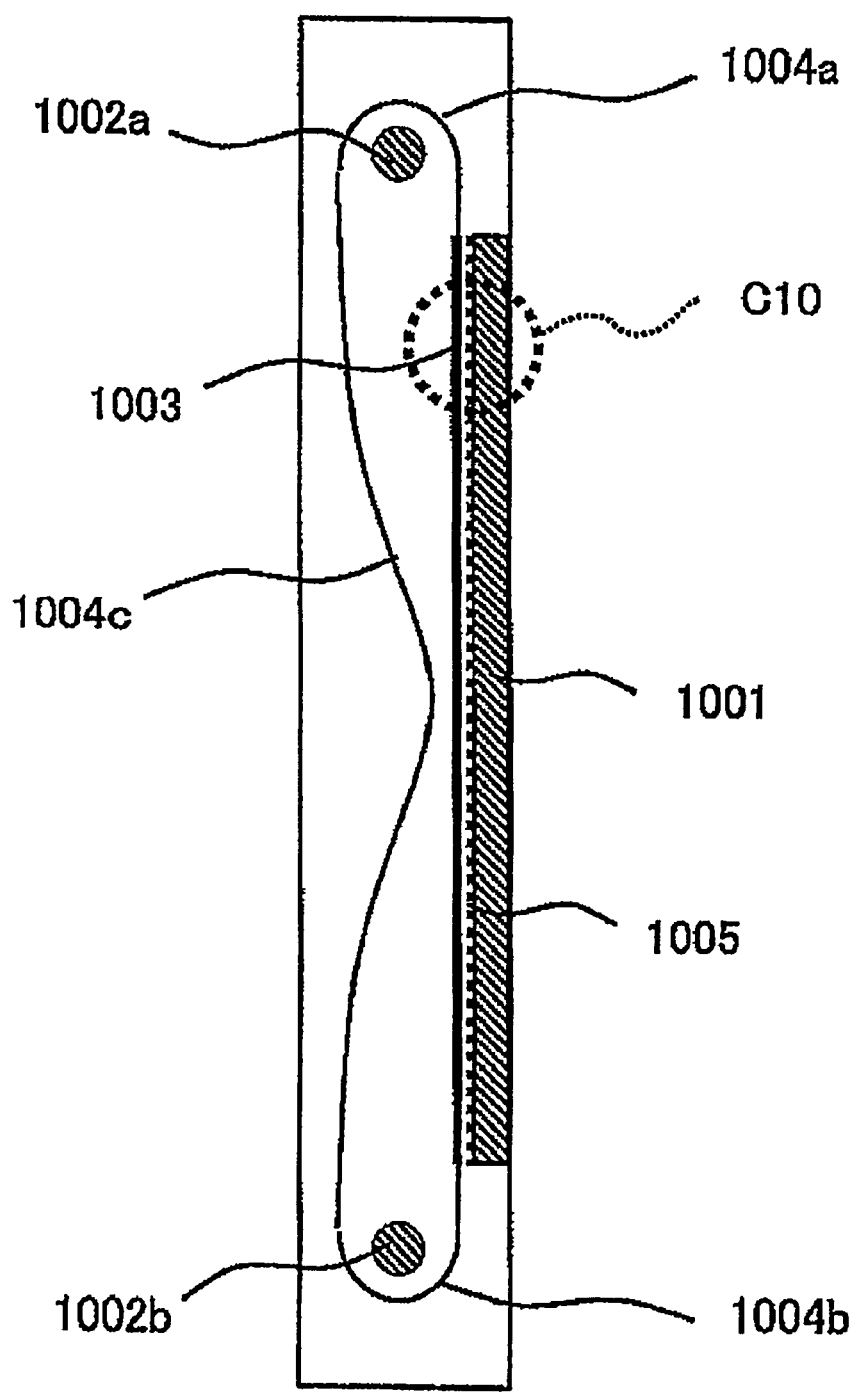
FIG. 9 is a longitudinal sectional view showing a schematic structure of a large-sized liquid crystal display according to a seventh embodiment of this invention.

FIG. 9 is a longitudinal sectional view of a large-sized liquid crystal display 1000 according to this embodiment. This large-sized liquid crystal display 1000 comprises a liquid crystal panel 1001, fluorescent lamps 1002a and 1002b, a transparent plate 1003, reflectors 1004a, 1004b, and 1004c, and a light guide portion 1005.

In this embodiment, the reflectors 1004a, 1004b, and 1004c are used for leading white light emitted from the two fluorescent lamps 1002a and 1002b to the back surface of the liquid crystal panel 1001. That is, in this embodiment, the white light from the fluorescent lamps 1002a and 1002b is reflected by the reflectors 1004a, 1004b, and 1004c so as to pass through the transparent plate 1003 and then is led to the liquid crystal panel 1001 through the light guide portion 1005.

The reflectors 1004a, 1004b, and 1004c are made of, for example, a resin and each have an inner surface formed with a reflective film. These reflectors can be formed with a very thin thickness as compared with a light guide plate and thus are lightweight. The reflectors 1004a, 1004b, and 1004c are in the form of three separate components for reasons such as in view of the manufacture, but may be formed integrally. Further, in this embodiment, the sectional shape of the reflectors 1004a and 1004b is circular. However, it may be the double-circle shape as shown in FIG. 6.

Figure 10:
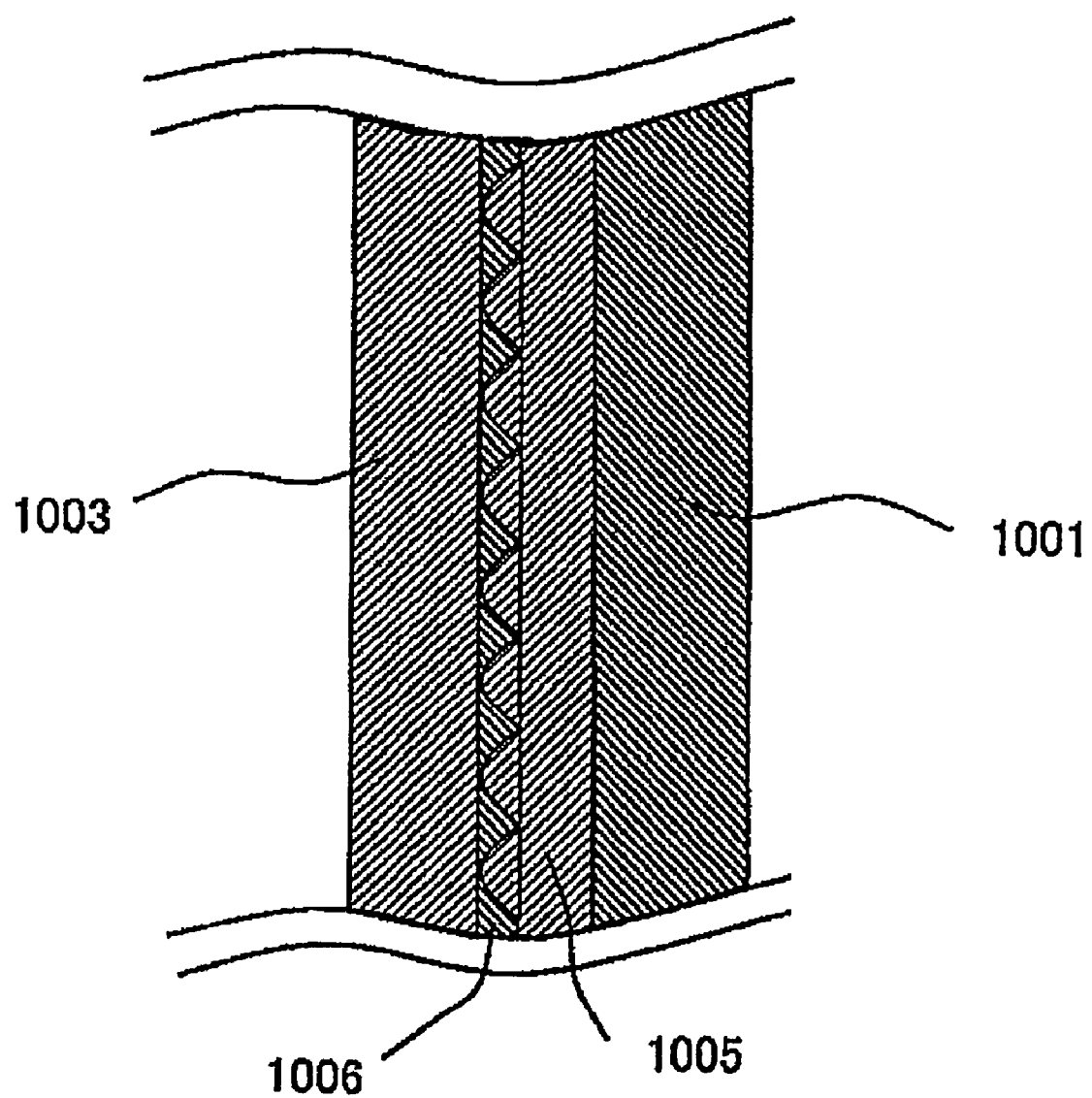
FIG. 10 is an enlarged view of the inside of a dotted circle in FIG. 9.

For showing the details of the structure between the transparent plate 1003 and the liquid crystal panel 1001, FIG. 10 shows a partial enlarged view of the inside of a dotted circle C10 in FIG. 9. As shown in FIG. 10, a surface, facing the transparent plate 1003, of the light guide portion 1005 disposed between the transparent plate 1003 and the liquid crystal panel 1001 is formed with a fine structure, and silver plating 1006 or a reflective material such as a highly reflective metal like aluminum or highly reflective polycarbonate is provided in gaps of the fine structure.

According to this embodiment, a light guide plate becomes unnecessary and, therefore, the weight can be largely reduced, for example, as compared with the structure using the light guide plate shown in FIG. 1.

Further, by employing the structure in which the light guide portion 1005 having many projections is in contact with the transparent plate 1003 and the reflective material such as silver plating is provided in the gaps therebetween like in this embodiment, it is applicable not only to the case of using two fluorescent lamps like in this embodiment, but also to a general backlight using a larger number of cold cathode fluorescent lamps.

The invention claimed is:

1. A liquid crystal display comprising:
a plurality of linear or rod-like light sources disposed substantially parallel to each other;
a light guide plate disposed so that its longitudinal direction is substantially parallel to said light sources;
total reflecting means provided on a back surface of said light guide plate;
a liquid crystal panel provided on a front surface side opposite to said back surface;
and semi-transmissive reflecting means provided between said light guide plate and said liquid crystal panel;
wherein said back surface of said light guide plate is concavely curved and said front surface of said light guide plate is flat, and thereby a thickness of said light guide plate decreases as going from its end faces, where light from said light sources is incident, to its inner portion; and
wherein said end faces each bulge in a convex lens shape; and
wherein said semi-transmissive reflecting means comprises a light guide portion and a plurality of contact portions that contact with said light guide plate to allow the light to proceed in said light guide portion.

2. A liquid crystal display comprising:
a plurality of linear or rod-like light sources disposed substantially parallel to each other;
a light guide plate disposed so that its longitudinal direction is substantially parallel to said light sources;
first reflecting means provided on a back surface of said light guide plate;

second reflecting means on a surface behind and in the periphery of the plurality of light sources, wherein the second reflecting means is formed in the shape of two connected and different sized circles;

a liquid crystal panel provided on a front surface side opposite to said back surface; and semi-transmissive reflecting means provided between said light guide plate and said liquid crystal panel, wherein said back surface of said light guide plate is concavely curved and said front surface of said light guide plate is flat, and wherein a reflective material is provided in gaps between said light guide plate and said semi-transmissive reflecting means.

3. A liquid crystal display comprising:
a liquid crystal panel;
a light guide portion;
a first light guide plate;
a second light guide plate;
a third light guide plate;
a first fluorescent lamp located between the first light guide plate and the second light guide plate;
a second fluorescent lamp located between the second light guide plate and the third light guide plate; and
a first and a second reflector,
wherein the first reflector is located on a back side of the first fluorescent lamp opposite of the liquid crystal panel,
wherein the second reflector is located on a back side of the second fluorescent lamp opposite of the liquid crystal panel,
wherein the surfaces of the first light guide plate, the second light guide plate, and the third light guide plate facing the light guide portion are flat,
wherein a first partially transmissive plate is located on a front side of the first fluorescent lamp facing the light guide portion and a second partially transmissive plate is located on a front side of the second fluorescent lamp facing the light guide portion, such that the first partially transmissive plate and second partially transmissive plate are located in grooves created by the first, second, and third light guide plates, and
wherein the first reflector and the second reflector are triangular shape.

4. A liquid crystal display according to claim 3, wherein said first and second reflectors, said first and second fluorescent lamps, and said first and second partially transmissive plates are disposed in said grooves created by the first, second, and third light guide plates.

5. A liquid crystal display according to claim 3, wherein the liquid crystal panel is disposed on a front surface side of said light guide portion.

6. A liquid crystal display according to claim 3, wherein said first and second fluorescent lamps are hot cathode fluorescent lamps.

7. A liquid crystal display comprising:
a liquid crystal panel;
a light guide portion;
a first light guide plate;
a second light guide plate;
a third light guide plate;
a first fluorescent lamp located between the first light guide plate and the second light guide plate;
a second fluorescent lamp located between the second light guide plate and the third light guide plate; and
a first and a second reflector,
wherein the first reflector is located on a back side of the first fluorescent lamp opposite of the liquid crystal panel,
wherein the second reflector is located on a back side of the second fluorescent lamp opposite of the liquid crystal panel,
wherein the surfaces of the first light guide plate, the second light guide plate, and the third light guide plate facing the light guide portion are flat, and
wherein the first and second fluorescent lamps each have an intermediate portion of smaller diameter than an end portion.

8. A liquid crystal display according to claim 3, wherein said first and second partially transmissive plates are flat.

9. A liquid crystal display according to claim 3, wherein a cross sectional shape of the back side of the second light guide plate opposite of the liquid crystal panel is arcuate.

10. A liquid crystal display according to claim 3, wherein the first and second partially transmissive plates cause white light proceeding toward the liquid crystal panel from the first and second fluorescent lamps to be directly incident on the liquid crystal panel.

11. A liquid crystal display according to claim 3, wherein the first and second partially transmissive plates comprise polycarbonate and titanium oxide.

12. A liquid crystal display according to claim 3, wherein the first, second, and third light guide plates are three separate components.

13. A liquid crystal display according to claim 3, wherein the first, second, and third light guide plates are one continuous component.

* * * * *